(12) United States Patent
Vigild et al.

(10) Patent No.: US 8,950,384 B2
(45) Date of Patent: Feb. 10, 2015

(54) METHOD FOR OPERATING AN INTERNAL COMBUSTION ENGINE WITH CHARGE-AIR COOLER

(75) Inventors: Christian Winge Vigild, Aldenhoven (DE); Andreas Kuske, Geulle (NL); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 13/539,094

(22) Filed: Jun. 29, 2012

(65) Prior Publication Data

US 2013/0000611 A1  Jan. 3, 2013

(30) Foreign Application Priority Data

Jun. 30, 2011 (DE) .......................... 10 2011 078 454

(51) Int. Cl.
| | |
|---|---|
| *F02B 33/00* | (2006.01) |
| *F02M 15/00* | (2006.01) |
| *F28F 27/02* | (2006.01) |
| *F02B 29/04* | (2006.01) |

(52) U.S. Cl.
CPC ........... *F02B 29/0418* (2013.01); *Y02T 10/146* (2013.01)
USPC ........ 123/563; 123/559.1; 123/542; 165/103; 60/599

(58) Field of Classification Search
USPC ............................................ 123/542; 165/96
See application file for complete search history.

(56) References Cited

U.S. PATENT DOCUMENTS

| | | | |
|---|---|---|---|
| 5,228,368 A | 7/1993 | Kato et al. | |
| 7,621,128 B2 * | 11/2009 | Czarnowski et al. | ........ 60/605.2 |
| 7,712,312 B2 | 5/2010 | Sexton | |
| 2008/0155983 A1 * | 7/2008 | Hagberg et al. | ................. 60/599 |
| 2010/0043761 A1 * | 2/2010 | Joergl et al. | .................... 123/563 |
| 2010/0050960 A1 | 3/2010 | Araki et al. | |
| 2010/0050997 A1 | 3/2010 | Huber et al. | |
| 2010/0095670 A1 * | 4/2010 | Grzonkowski et al. | ......... 60/602 |
| 2010/0263637 A1 | 10/2010 | Müller et al. | |
| 2011/0030662 A1 * | 2/2011 | Zitzler et al. | ............. 123/568.12 |

* cited by examiner

*Primary Examiner* — Linday Low
*Assistant Examiner* — Syed O Hasan
(74) *Attorney, Agent, or Firm* — Julia Voutyras; Alleman Hall McCoy Russell & Tuttle LLP

(57) ABSTRACT

An example method for operating an internal combustion engine having at least one cylinder, at least one intake line for supplying charge air to the at least one cylinder, and a device for controlling charge-air flows conducted via a charge-air cooler and via a bypass line around the charge-air cooler is described, the device including a two-stage switchable shut-off element and a continuously adjustable shut-off element. In one example provided, the two-stage switchable shut-off element is arranged parallel to the bypass line in the at least one intake line, and is switched between an open position and a closed position, and the bypass line is opened up or shut off to a greater or lesser extent by the shut-off element which is continuously adjustable between an open position and a closed position. In this way, shuddering of the engine during shut down is prevented.

9 Claims, 3 Drawing Sheets

METHOD FOR OPERATING AN INTERNAL COMBUSTION ENGINE WITH CHARGE-AIR COOLER

RELATED APPLICATIONS

The present application claims priority to German Patent Application Number 102011078454.3, filed on Jun. 30, 2011, the entire contents of which are hereby incorporated by reference for all purposes.

FIELD

The disclosure relates to a method for operating an internal combustion engine.

BACKGROUND AND SUMMARY

Internal combustion engines are ever more commonly being equipped with supercharging, wherein supercharging is primarily a method for increasing power, in which the charge air required for the combustion process in the engine is compressed, as a result of which a greater mass of charge air can be supplied to each cylinder per working cycle. In this way, the fuel mass and therefore the mean effective pressure can be increased.

It is preferable for a charge-air cooler to be provided in the intake line, by means of which the charge air is cooled before it enters the at least one cylinder. The cooler lowers the temperature and thereby increases the density of the charge air, such that the cooler also contributes to improved charging of the at least one cylinder, that is to say to a greater air mass. In effect, compression by cooling takes place.

If the internal combustion engine is equipped with an exhaust-gas recirculation (EGR) system, the exhaust gas recirculated by means of EGR to the inlet side is mixed with fresh intake air and the mixture of fresh air and recirculated exhaust gas produced in this way forms the charge air, which is then if appropriate supplied to the charge-air cooler for cooling. Recirculated exhaust gas may basically be introduced into the at least one intake line of the intake system upstream or downstream of the charge-air cooler.

It is not the aim to extract the greatest possible amount of heat from the charge air by means of charge-air cooling continuously, that is to say under all operating conditions of the internal combustion engine. In fact, demand-dependent control of the charge-air cooling is sought which allows for the different operating modes of an internal combustion engine and which takes into consideration that it may be advantageous to supply non-cooled charge air to the internal combustion engine, for example in the warm-up phase of the internal combustion engine or during the regeneration of a particle filter provided at the outlet side in the exhaust system. It is assumed here that an increase in the temperature of the charge air and therefore of the cylinder fresh charge likewise increases the exhaust-gas temperature.

To be able to bypass the charge-air cooler, that is to say to be able to conduct the charge air past the charge-air cooler, a bypass line is provided which branches off from the at least one intake line upstream of the charge-air cooler and which opens into the at least one intake line again downstream of the charge-air cooler. A device is required for controlling the charge-air flows conducted via the charge-air cooler and via the bypass line.

According to previous systems, it is possible to arrange in the bypass line a preferably continuously adjustable shut-off element by means of which the bypass line is opened up or shut off to a greater or lesser extent, whereby the flow resistance posed to the charge-air flow by the bypass line is varied and set.

When the bypass line is closed, that is to say shut off, all of the charge air flows through the charge-air cooler. If in contrast the bypass line is opened to a greater or lesser extent, the charge-air flow is split up, with only a part of the charge-air flow passing through the charge-air cooler and the remaining charge-air flow being conducted past the charge-air cooler via the bypass line. Here, the magnitude of the two partial flows is dependent on the position of the shut-off element provided in the bypass line.

The above-described concept for controlling the charge-air cooling makes it possible for the bypass line to be opened up when the shut-off element is open and shut off by moving the shut-off element into the closed position.

In contrast, the intake line leading through the charge-air cooler is always open, that is to say is continuously open, and also cannot be varied in terms of its flow cross section. The charge-air cooler therefore cannot be fully deactivated, such that always a part of the charge-air flow passes through the charge-air cooler. This fact has two disadvantageous effects. Firstly, a part of the charge-air flow is always cooled, even when only non-cooled charge air is supposed to be supplied to the internal combustion engine. Secondly, even after the internal combustion engine is shut down, charge air is supplied to the at least one cylinder via the intake line or intake system owing to the suction effect of the at least one running-down piston. The latter situation causes shuddering of the internal combustion engine owing to the running-down process, which lasts several working cycles.

The inventor herein has recognized the above issues and provides an approach to at least partly address them. In one embodiment, a method for operating an internal combustion engine having at least one cylinder, at least one intake line for supplying charge air to the at least one cylinder, and a device for controlling charge-air flows conducted via a charge-air cooler and via a bypass line around the charge-air cooler, comprises controlling the charge-air flows using the device, the device including a two-stage switchable shut-off element and a continuously adjustable shut-off element, wherein the two-stage switchable shut-off element, which is arranged parallel to the bypass line in the at least one intake line, is switched between an open position and a closed position, and the bypass line is opened up or shut off to a greater or lesser extent by the shut-off element which is continuously adjustable between an open position and a closed position.

In this way, the intake air may be routed to the engine fully via the charge air cooler, partially via the charge air cooler, or without passing through the charge air cooler, depending on desired intake air cooling. Further, by closing both shut-off elements, intake air may be prevented from reaching the engine, with which shuddering of the internal combustion engine as it is shut down is prevented.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
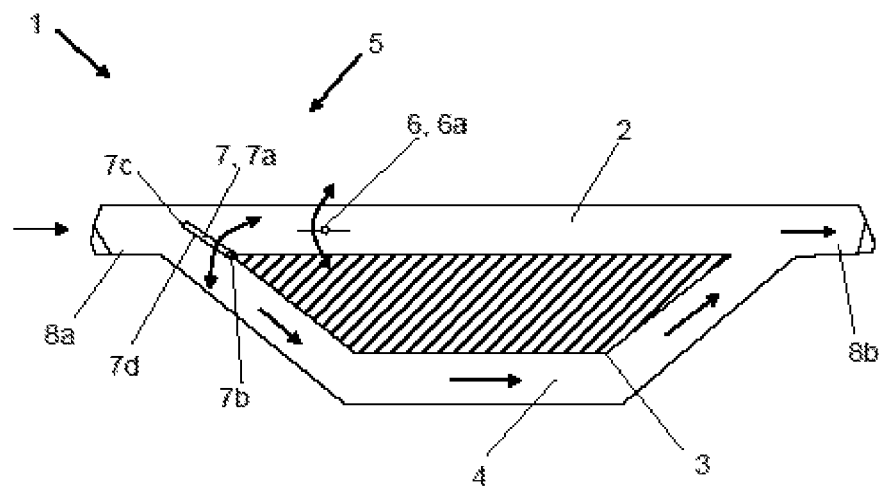
FIG. 1 schematically shows a part of the intake system of a first embodiment of the internal combustion engine comprising the device for controlling the charge-air flows in a first switching state.

The present application incorporates by reference the entirety of U.S. patent application Ser. No. 13/485,725, filed May 31, 2012.

According to the disclosure, two shut-off elements are provided for controlling the charge-air flows. In comparison with the previous approaches, the internal combustion engine is provided with an additional shut-off element which is switchable in two stages and which is arranged in the at least one intake line. Said shut-off element serves for activating and deactivating the charge-air cooler by opening up and shutting off the intake line. In order that the bypass line or the flow cross section provided by the bypass line for the charge-air flow remains uninfluenced by the switching state of said shut-off element, the shut-off element is arranged in that part of the intake line which runs parallel to the bypass line.

The two-stage switchable shut-off element can be moved into the closed position when non-cooled charge air is to be supplied to the internal combustion engine, for example after a cold start, when the internal combustion engine should warm up as quickly as possible in order to reduce friction losses and emissions. If a particle filter provided for exhaust-gas aftertreatment is to be regenerated, it is likewise expedient to increase the charge-air temperature by bypassing the cooling, in order thereby to increase the exhaust-gas temperature. In both of the situations mentioned, the bypass line is then used to supply non-cooled charge air to the at least one cylinder.

In addition to the two-stage switchable shut-off element, the internal combustion engine according to the disclosure or the device for controlling the charge-air flows has a shut-off element which is continuously adjustable between an open position and a closed position and by means of which the flow cross section of the bypass line is varied and set in a continuously variable manner.

While the two-stage switchable shut-off element either shuts off or opens up the intake line leading through the charge-air cooler, the charge-air flow conducted via the bypass line may be varied and controlled as desired using the continuously adjustable shut-off element.

When the switchable shut-off element is in the open position, the charge-air flow can be split up into a partial air flow which passes through the charge-air cooler and a partial air flow which is conducted past the charge-air cooler via the bypass line. Here, the magnitude of the two partial flows is dependent on the position of the continuously adjustable shut-off element.

Since the supply of charge air to the at least one cylinder of the internal combustion engine according to the disclosure can be prevented by closing both shut-off elements, it is possible, during the shutting-down of the internal combustion engine, for shuddering of the internal combustion engine owing to a slowing running-down process to be prevented by moving the two shut-off elements into the closed position.

Examples of the method are advantageous in which the two-stage switchable shut-off element and/or the continuously adjustable shut-off element are controlled electrically, hydraulically, pneumatically, mechanically or magnetically, and in some examples controlled by an engine controller.

Examples of the method are advantageous in which a throttle flap is used as a two-stage switchable shut-off element. The throttle flap is a proven and tested element for controlling the flow cross section of an intake line. Depending on the individual situation, if a throttle flap is used as a two-stage switchable shut-off element, it is possible to use even throttle flaps which are already available on the market, such that the production costs or procurement costs for said shut-off element which is arranged in the intake line are relatively low, that is to say can be kept low.

The fact that it is generally not possible for the intake line to be completely shut off by means of the throttle flap, that is to say that there may be a leakage flow of greater or lesser magnitude across the throttle flap when the throttle flap is in the closed position, is not detrimental and can be disregarded in the present case, that is to say in conjunction with the functioning of this shut-off element.

Nevertheless, method variants are advantageous in which the two-stage switchable shut-off element, when it is in the closed position, completely shuts off the intake line.

Examples of the method are advantageous in which a flap which is pivotable about an axis of rotation is used as a continuously adjustable shut-off element. A flap, together with a corresponding seat which receives the flap in a virtually gas-tight fashion when the latter is in the closed position, permits virtually complete shutting-off of the bypass line.

Furthermore, a pivotable flap may be utilized, in the open position, to narrow or shut off as far as possible the cross section of the intake line, and thereby hinder the inflow of the charge-air flow into the charge-air cooler, that is to say pose a resistance to said charge-air flow. In interaction with a two-stage switchable shut-off element which is situated in the closed position, virtually complete shutting-off of the intake line is then possible.

Examples of the method are advantageous in which the device is arranged on the inlet side of the charge-air cooler. With said configuration of the intake system, an inflow of charge air into the cooler and therefore a continuous supply of charge air to the cooler can be prevented through corresponding control of the shut-off elements.

With regard to the variant in question, in the case of internal combustion engines in which a flap which is pivotable about an axis of rotation is used as a continuously adjustable shut-off element, examples are advantageous in which the axis of rotation is arranged downstream of the freely pivotable end of the flap.

With said arrangement of the axis of rotation, as the flap opens, the charge-air flow impinges on the inner side of the flap, that is to say on that side of the flap which faces toward the bypass line. A part of the charge-air flow is captured in the flap and is diverted into the bypass line, whereas the remaining charge-air flow passes, in the case of the intake line being open, into the cooler.

As the flap moves from the closed position into the open position, the free end of the flap is moved about the axis of rotation along a circular arc, specifically in the direction of the flow in the intake line.

Embodiments of the internal combustion engine may however also be advantageous in which the device is arranged on the outlet side of the charge-air cooler. In contrast to the embodiments described above, in which the device is arranged on the inlet side of the charge-air cooler, an inflow of charge air into the cooler and therefore a continuous supply of charge air to the cooler cannot be prevented in the present case.

Examples of the method may however also be advantageous in which the device is arranged on the outlet side of the charge-air cooler. In contrast to the variant described above, in which the device is arranged on the inlet side of the charge-air cooler, an inflow of charge air into the cooler and therefore a continuous supply of charge air to the cooler cannot be prevented in the present case.

With regard to the variant in question, in the case of internal combustion engines in which a flap which is pivotable about an axis of rotation is used as a continuously adjustable shut-off element, examples are advantageous in which the axis of rotation is arranged upstream of the freely pivotable end of the flap.

With said arrangement of the axis of rotation, as the flap opens, the charge-air flow impinges on the outer side of the flap, that is to say on that side of the flap which faces away from the bypass line. The flow cross section of the intake line is narrowed, and the bypass line is opened up for the charge air.

As the flap moves from the closed position into the open position, the free end of the flap is moved about the axis of rotation along a circular arc, specifically counter to the direction of the flow in the intake line.

During the course of the cooling, liquids previously contained in the charge air still in gaseous form, in particular water, may condense out if the dew point temperature of a component of the gaseous charge-air flow is undershot. Depending on the arrangement of the charge-air cooler and owing to the fact that the precipitated condensate is not supplied continuously to the at least one cylinder by the charge-air flow as a result of kinetics, condensate may collect in the charge-air cooler, which condensate is then introduced from the charge-air cooler into the intake system unpredictably and in large quantities in an abrupt manner, for example in the event of lateral acceleration when traveling around a curve, when traveling up a hill or in the event of a shock. The latter is also referred to as water hammer, which can lead not only to a severe disruption in the operation of the internal combustion engine but rather may also lead to irreversible damage of components downstream of the cooler.

If an exhaust-gas recirculation arrangement is provided, said problem takes on increased significance with increasing recirculation rate, because with the increase of the recirculated exhaust-gas quantity, the fractions of the individual exhaust-gas components in the charge air, in particular of the water contained in the exhaust gas, inevitably increase.

Examples are therefore advantageous in which the charge-air cooler is arranged so as to be inclined by an angle $\alpha$ from the inlet into the charge-air cooler to the outlet out of the charge-air cooler. Here, the charge-air cooler is set at an angle such that a downward slope is formed between the inlet and outlet and the transport of a condensate is assisted in a gravity-driven manner already in the cooler in order to counteract any accumulation. With regard to the angle $\alpha$, said angle relates to a virtual straight line running through the inlet and the outlet. Angles $\alpha$ are advantageous which satisfy the following criteria: $\alpha \geq 5°$, preferably $45° \geq \alpha \geq 5°$, or: $\alpha \geq 10°$, preferably $90° \geq \alpha \geq 10°$.

Here, examples are advantageous in which the geodetic height in the intake system decreases continuously in the flow direction proceeding from the inlet into the charge-air cooler toward the at least one inlet opening of the at least one cylinder. It is thereby ensured that the charge-air flow does not need to overcome any gradient over the entire path proceeding from the inlet into the charge-air cooler to the at least one cylinder, that is to say there is a continuous downward slope in the flow direction.

Said example ensures that no condensate collects in the cooler and downstream of the charge-air cooler in the intake system.

Examples of the internal combustion engine are advantageous in which the charge-air cooler is arranged at the geodetically highest point in the intake system.

In the case of internal combustion engines with at least one outlet-side exhaust line for discharging the exhaust gases, method variants are advantageous in which at least one exhaust-gas turbocharger is provided for supercharging the internal combustion engine, which exhaust-gas turbocharger comprises a turbine arranged in the at least one exhaust line and a compressor arranged in the at least one intake line, and an exhaust-gas recirculation arrangement is provided which comprises a recirculation line which branches off from the at least one exhaust line downstream of the turbine and opens into the at least one intake line upstream of the compressor.

In an exhaust-gas turbocharger, a compressor and a turbine are arranged on the same shaft. The hot exhaust-gas flow is supplied to the turbine, expands in the turbine with a release of energy, and sets the shaft in rotation. The energy supplied by the exhaust-gas flow to the shaft is used for driving the compressor which is likewise arranged on the shaft. The compressor delivers and compresses the charge air supplied to it, as a result of which supercharging of the at least one cylinder is obtained.

The advantage of an exhaust-gas turbocharger in comparison with a mechanical charger is that no mechanical connection for transmitting power is required between the charger and internal combustion engine. While a mechanical charger extracts the energy required for driving it directly from the internal combustion engine, and thereby reduces the available power and thereby adversely affects the efficiency, the exhaust-gas turbocharger utilizes the exhaust-gas energy of the hot exhaust gases.

By supercharging, the load collective can be shifted toward higher loads while maintaining otherwise identical vehicle boundary conditions, as a result of which the specific fuel consumption can be reduced. Supercharging consequently assists in the constant efforts in the development of internal combustion engines to minimize fuel consumption. With targeted configuration of the supercharging, it is also possible to obtain advantages with regard to exhaust-gas emissions. To adhere to future limit values for pollutant emissions, further measures are however necessary, for example the recirculation of combustion gases from the outlet side to the inlet side.

By exhaust-gas recirculation (EGR), the nitrogen oxide emissions can be considerably reduced. Here, the exhaust-gas recirculation rate $x_{EGR}$ is determined as $x_{EGR} = m_{EGR}/(m_{EGR} + m_{fresh\ air})$, where $m_{EGR}$ denotes the mass of recirculated exhaust gas and $m_{fresh\ air}$ denotes the supplied fresh air. To obtain a considerable reduction in nitrogen oxide emissions, high exhaust-gas recirculation rates are required which may be of the order of magnitude of $x_{EGR} \approx 60\%$ to $70\%$.

When operating an internal combustion engine with exhaust-gas turbocharging and the simultaneous use of an exhaust-gas recirculation arrangement, a conflict may arise if the recirculated exhaust gas is extracted from the exhaust line upstream of the turbine by means of high-pressure EGR and is no longer available for driving the turbine.

In the event of an increase in the exhaust-gas recirculation rate, the exhaust-gas flow introduced into the turbine simultaneously decreases. The reduced exhaust-gas mass flow through the turbine leads to a lower turbine pressure ratio, as a result of which the charge pressure ratio also falls, which equates to a smaller compressor mass flow. Aside from the decreasing charge pressure, additional problems may arise in the operation of the compressor with regard to the surge limit of the compressor. Disadvantages may also arise with regard to the pollutant emissions.

For this reason, too, variants are advantageous in which the exhaust gas which has already flowed through the turbine is recirculated to the inlet side by means of low-pressure EGR. The low-pressure EGR arrangement comprises a recirculation line which branches off from the exhaust line downstream of the turbine and opens into the intake line upstream of the compressor.

The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor and compressed, wherein the compressed charge air is cooled, downstream of the compressor, in the charge-air cooler.

Here, the fact that exhaust gas is conducted through the compressor during the course of the low-pressure EGR is not detrimental if exhaust gas is used which has been subjected to exhaust-gas aftertreatment, in particular in the particle filter, downstream of the turbine. There is then no risk of depositions in the compressor which change the geometry of the compressor, in particular the flow cross sections, and thereby impair the efficiency of the compressor. The low-pressure EGR arrangement may be equipped with a separate cooler.

Examples are advantageous in which the charge-air cooler is liquid-cooled. It is fundamentally possible for the cooling arrangement to be designed, according to the principle of a heat exchanger, in the form of an air cooling arrangement or a liquid cooling arrangement. In the case of the air cooling arrangement, the charge air conducted through the charge-air cooler is cooled by an air flow which results from the relative wind and/or which is generated by a blower. In contrast, the liquid cooling arrangement necessitates the formation of a cooling circuit, if appropriate using an already existing circuit, for example the engine cooling circuit of a liquid-cooled internal combustion engine. Here, the coolant is fed by means of a pump arranged in the cooling circuit, such that said coolant circulates and flows through the charge-air cooler. The heat dissipated from the charge air to the coolant in the cooler is conducted away, and extracted from the coolant again in another heat exchanger.

On account of the significantly higher heat capacity of a liquid in relation to air, it is possible for significantly greater heat quantities to be dissipated by liquid cooling than is possible with air cooling. For this reason, in particular in the case of supercharged internal combustion engines with exhaust-gas recirculation, it is advantageous for the charge-air cooler to be liquid-cooled, because the heat quantity to be dissipated may be relatively large.

Examples are advantageous in which an additional exhaust-gas recirculation arrangement is provided which comprises a line which branches off from the at least one exhaust line upstream of the turbine and opens into the at least one intake line downstream of the compressor.

The provision of a high-pressure EGR arrangement may be necessary or expedient for generating the high recirculation rates required for reducing the nitrogen oxide emissions. It may be taken into consideration that the recirculation of exhaust gas from the exhaust line into the intake line requires a pressure difference, that is to say a pressure gradient, between the outlet side and the inlet side. Furthermore, to obtain the required high exhaust-gas recirculation rates, a high pressure gradient is required.

Here, examples are advantageous in which the line opens into the at least one intake line downstream of the charge-air cooler. The exhaust gas recirculated via the high-pressure EGR arrangement is generally not aftertreated. Said exhaust gas in fact constitutes untreated emissions of the internal combustion engine, for which reason the exhaust gas should preferably not be conducted through the charge-air cooler, in order to prevent contamination of the cooler.

Examples are nevertheless advantageous in which an additional cooler is provided in the line of the high-pressure EGR arrangement. Said additional cooler lowers the temperature in the hot exhaust-gas flow and thereby increases the density of the exhaust gases. The temperature of the cylinder fresh charge is further lowered in this way, as a result of which the additional cooler also contributes to improved charging of the combustion chamber with fresh mixture.

Examples of the method are advantageous in which, by the continuously adjustable shut-off element being in the closed position, the bypass line is blocked, and by the continuously adjustable shut-off element being in the open position, the at least one intake line is blocked. Said variant makes it possible for the charge-air flow to be conducted both entirely through the charge-air cooler and also entirely past the charge-air cooler via the bypass line, and this independently of the switching state of the two-stage switchable shut-off element in the intake line.

Examples of the method are however also advantageous in which, by means of the continuously adjustable shut-off element, in the closed position, the bypass line is blocked, and in the open position, the at least one intake line is at least narrowed. A leakage flow of greater or lesser magnitude can be observed across the throttle flap.

Aside from its actual function of opening up or shutting off the bypass line to a greater or lesser extent, the continuously adjustable shut-off element is also used in the present case to impede inflow of charge air into the charge-air cooler, that is to say to appreciably block said charge-air flow.

Examples of the method are advantageous in which the continuously adjustable shut-off element is closed and the two-stage switchable shut-off element is opened in order to conduct the entire charge-air flow through the charge-air cooler and cool said charge-air flow.

In this way, all of the charge air is cooled before it enters into the at least one cylinder. Here, the cooler increases the density of the charge air. As a result of this compression, a greater mass of air is supplied to the at least one cylinder. This is advantageous in particular in the event of a demand for high power or a high recirculation rate generated by means of low-pressure EGR.

Examples of the method are advantageous in which the continuously adjustable shut-off element is at least partially opened and the two-stage switchable shut-off element is opened in order to conduct the charge-air flow partially through the charge-air cooler and partially past the charge-air cooler via the bypass line. The charge-air flow is split up upstream of the cooler, wherein the temperature of the cylinder fresh charge is set in accordance with the split ratio during the mixing of the charge-air partial flows downstream of the cooler.

Examples of the method are advantageous in which the continuously adjustable shut-off element is fully opened and the two-stage switchable shut-off element is closed in order to conduct the charge-air flow substantially past the cooler via the bypass line.

Here, the charge-air cooler is deactivated such that a negligible fraction of the charge-air flow—if any—flows through the charge-air cooler. This switching state of the shut-off elements is advantageous in particular for two operating modes of the internal combustion engine. Firstly, almost exclusively non-cooled charge air can be supplied to the internal combustion engine during the warm-up phase, such that fast heating takes place after a cold start. This is expedient in particular with regard to friction losses and pollutant emissions. Secondly, non-cooled charge air can be supplied to the internal combustion engine during the regeneration of a particle filter provided at the outlet side in the exhaust system, as a result of which the exhaust-gas temperature can be raised, such that the particle filter reaches its regeneration temperature more quickly. The temperature required for the regeneration of a particle filter is approximately 550° C. without catalytic assistance.

In this connection, examples of the method are advantageous in which the continuously adjustable shut-off element is only partially opened and the two-stage switchable shut-off element is closed in order to conduct the charge-air flow substantially past the cooler via the bypass line and in the process throttle said charge-air flow.

If the non-cooled charge-air flow is additionally throttled and, in this way, at the present operating point there is supplied to the at least one cylinder an unusually small amount of charge air, that is to say less than prescribed by the setpoint value, the fuel/air mixture in the cylinder is enriched, as a result of which the exhaust-gas temperatures are raised. A particle filter provided at the outlet side in the exhaust system reaches the regeneration temperature even more quickly.

Examples of the method are advantageous in which the continuously adjustable shut-off element is closed and the two-stage switchable shut-off element is closed in order to prevent the supply of charge air to the at least one cylinder.

In the present case, the intake system is deactivated by moving both shut-off elements into the closed position, such that only a negligible fraction of the charge-air flow—if any—passes into the at least one cylinder.

A supply of charge air to the at least one cylinder during the shutting-down of the internal combustion engine is in this way prevented, and therefore shuddering of the internal combustion engine owing to a slowing running-down process of the drive unit is prevented.

The switching state of the two shut-off elements as per the method variant in question may also serve for realizing an engine brake.

Examples are advantageous in which the turbine of the at least one exhaust-gas turbocharger is equipped with a variable turbine geometry, which enables a more precise adaptation to the respective operating point of the internal combustion engine by means of an adjustment of the turbine geometry or of the effective turbine cross section. Here, adjustable guide blades for influencing the flow direction are arranged in the inlet region of the turbine. In contrast to the rotor blades of the rotating rotor, the guide blades do not rotate with the shaft of the turbine.

If the turbine has a fixed, invariable geometry, the guide blades are arranged in the inlet region so as to be not only stationary but rather also completely immovable, that is to say rigidly fixed. In contrast, in the case of a variable geometry, the guide blades are—as stated—duly also arranged so as to be stationary but not so as to be completely immovable, rather so as to be rotatable about their axes, such that the flow approaching the rotor blades can be influenced.

Nevertheless, examples may also be advantageous in which the turbine of the at least one exhaust-gas turbocharger is formed with a fixed turbine geometry. In relation to a variable geometry, this considerably simplifies the operation of the internal combustion engine and/or of the charger by means of engine control. Furthermore, the simpler design of the turbine yields cost advantages with regard to the exhaust-gas turbocharger.

Method variants are advantageous in which at least two exhaust-gas turbochargers are provided.

If a single exhaust-gas turbocharger is used, a torque drop is observed if a certain rotational speed is undershot. This effect is undesirable. Said torque drop is understandable if one takes into consideration that the charge pressure ratio is dependent on the turbine pressure ratio. A reduction in the engine rotational speed leads to a smaller exhaust-gas mass flow and therefore to a lower turbine pressure ratio. This has the result that, toward lower rotational speeds, the charge pressure ratio likewise decreases, which equates to a torque drop.

The torque characteristic may be improved through the use of a plurality of exhaust-gas turbochargers, for example by means of a plurality of exhaust-gas turbochargers connected in series.

By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower part-load range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust line upstream of the high-pressure turbine and opens into the exhaust line again downstream of the turbine, wherein a shut-off element is arranged in the bypass line in order to control the exhaust-gas flow conducted past the high-pressure turbine.

The torque characteristic of a supercharged internal combustion engine may furthermore be improved by a plurality of turbochargers connected in parallel and having correspondingly small turbine cross sections, which turbochargers are activated in succession.

FIG. 1 schematically shows a part of the intake system 1 of a first embodiment of the internal combustion engine comprising the device 5 for controlling the charge-air flows in a first switching state. Within the context of the present disclosure, the expression "internal combustion engine" encompasses diesel engines, spark-ignition engines and also hybrid internal combustion engines.

The illustration shows a portion of the intake system 1 of an internal combustion engine (described in more detail below with respect to FIG. 3), which intake system comprises an intake line 2 for supplying charge air to the at least one cylinder. Provided in the intake line 2 is a charge-air cooler 3 by which the charge air is cooled before it enters into the at least one cylinder. The cooler 3 lowers the temperature and thus increases the density of the charge air, as a result of which compression by cooling takes place.

To be able to bypass the cooler 3, a bypass line 4 branches off from the intake line 2 upstream of the charge-air cooler 3, that is to say on the inlet side 8a of the cooler 3, which bypass line 4 opens into the intake line 2 again downstream of the charge-air cooler 3, that is to say on the outlet side 8b of the cooler 3.

To control the charge-air flows conducted via the charge-air cooler 3 and via the bypass line 4, a device 5 is provided which comprises a first bypass valve referred to as shut-off element 6, which is switchable in a two-stage fashion between an open position and a closed position and which is arranged parallel to the bypass line 4 in the intake line 2, and a second bypass valve, referred to as shut-off element 7, which is continuously adjustable between an open position and a closed position and which opens up or shuts off the bypass line 4 to a greater or lesser extent.

In the embodiment shown in FIG. 1, a throttle flap 6a is used as a two-stage switchable shut-off element 6 and a flap 7a which is pivotable about an axis of rotation 7b is used as a continuously adjustable shut-off element 7, wherein in the switching state illustrated, both the throttle flap 6a and also the pivotable flap 7a are in the open position. In the open position, the flap 7a narrows the intake line 2, as a result of which, despite the fact that the throttle flap 6a is open, the inflow of charge air into the charge-air cooler 3 is impeded, that is to say the intake line 2 is appreciably blocked. There is nevertheless a small leakage flow across the throttle flap 6a. The illustrated switching state is suitable for assisting the regeneration of a particle filter provided at the outlet side in the exhaust system, and for the warm-up phase after a cold start of the internal combustion engine.

In the present case, the device 5 is arranged on the inlet side 8a of the charge-air cooler 3, wherein the axis of rotation 7b of the flap 7a is arranged downstream of the freely pivotable end 7c of the flap 7a at the inlet into the bypass line 4. With this arrangement of the axis of rotation 7b, as the flap 7a opens, the charge-air flow impinges on the inner side 7d, which faces toward the bypass line 4, of the flap 7a. As the flap 7a moves from the closed position into the open position, the free end 7c of the flap 7a is moved about the axis of rotation 7b along a circular arc in the flow direction in the intake line 2.

A second switching state is possible in which both the continuously adjustable shut-off element 7, that is to say the flap 7a, and also the two-stage switchable shut-off element 6, that is to say the throttle flap 6a, are in the closed position. As a result of both shut-off elements 6, 7 having been moved into the closed position, the intake system 1 is deactivated, such that the at least one cylinder is no longer supplied with charge air. Shuddering during the shutting-down of the internal combustion engine is thereby prevented.

A third switching state is possible in which the continuously adjustable shut-off element 7, that is to say the flap 7a, is in the closed position and the two-stage switchable shut-off element 6, that is to say the throttle flap 6a, is in the open position. In this way, the entire charge-air flow is conducted through the charge-air cooler 3 and cooled.

A fourth switching state is possible in which the continuously adjustable shut-off element 7, that is to say the flap 7a, is only partially open and the two-stage switchable shut-off element 6, that is to say the throttle flap 6a, is in the open position. In the present case, the charge-air flow is conducted partially through the charge-air cooler 3 and partially past the charge-air cooler 3 via the bypass line 4. The charge-air flow is thereby split up at the inlet side, wherein the temperature of the cylinder fresh charge is set in accordance with the split ratio during the mixing of the charge-air partial flows at the outlet side of the cooler.

A fifth switching state is possible in which the continuously adjustable shut-off element 7, that is to say the flap 7a, is only partially open and the two-stage switchable shut-off element 6, that is to say the throttle flap 6a, is in the closed position. In the present case, the charge-air flow is not split up because the throttle flap 6a is closed. Since the flap 7a is only partially open, the charge-air flow entering into the bypass line 4 is throttled.

Such a switching state may be advantageous, with regard to the regeneration of a particle filter provided at the outlet side in the exhaust system, for attaining the regeneration temperature more quickly.

An open flap 7a together with a closed throttle flap 6a is also advantageous with regard to the warm-up phase of the internal combustion engine—as already stated with regard to FIG. 1.

Figure 2:
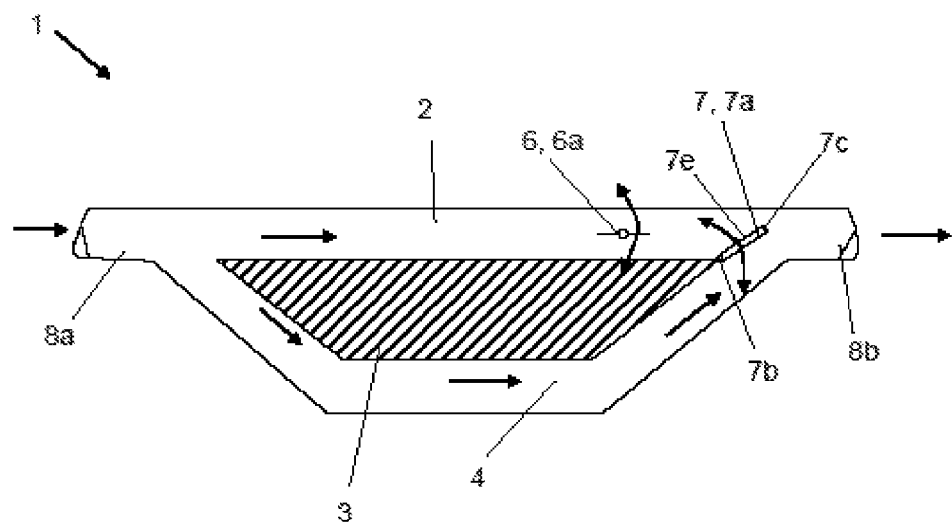
FIG. 2 schematically shows a part of the intake system of a second embodiment of the internal combustion engine comprising the device for controlling the charge-air flows in a first switching state.

FIG. 2 schematically shows a part of the intake system 1 of a second embodiment of the internal combustion engine comprising the device 5 for controlling the charge-air flows. In the embodiment illustrated in FIG. 2, the device 5 for controlling the charge-air flows is arranged on the outlet side 8b of the charge-air cooler 3, wherein the axis of rotation 7b of the flap 7a is arranged upstream of the freely pivotable end 7c of the flap 7a at the outlet from the bypass line 4. With this arrangement of the axis of rotation 7b, as the flap 7a opens, the charge-air flow impinges on the outer side 7e, which faces away from the bypass line 4, of the flap 7a. As the flap 7a moves from the closed position into the open position, the free end 7c of the flap 7a is moved about the axis of rotation 7b along a circular arc counter to the flow direction in the intake line 2.

Figure 3:
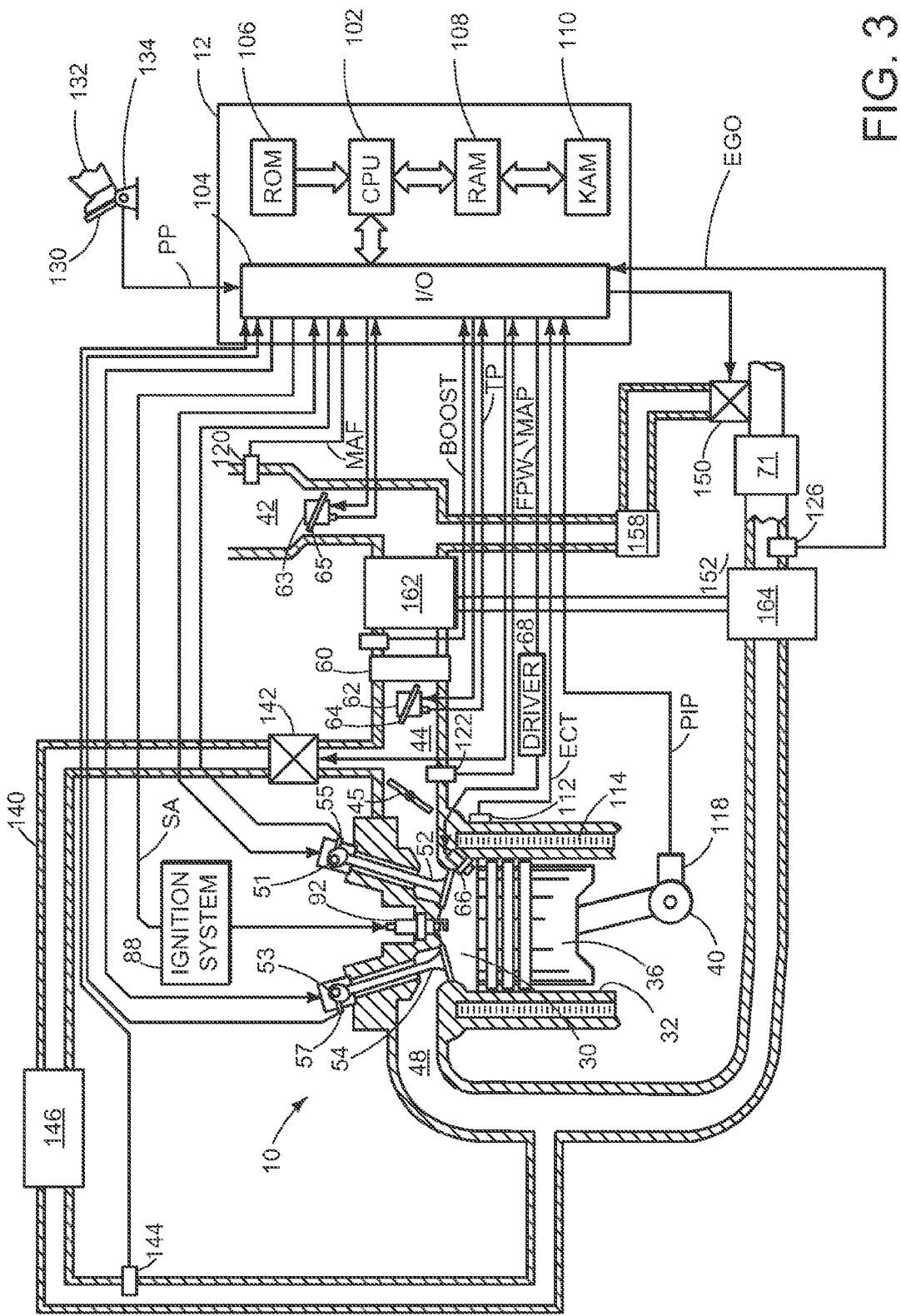
FIG. 3 schematically shows an engine including the intake system of FIG. 1.

Referring now to FIG. 3, is a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. In some embodiments, the ignition system may include a dual spark system which includes two spark plugs per cylinder (not shown).

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12. Further, intake manifold 44 may include charge motion control valve 45 for controlling the intensity of charge motion occurring in combustion chamber 30.

Further, in the disclosed embodiments, an exhaust gas recirculation (EGR) system may route a desired portion of exhaust gas from exhaust passage 48 to intake passage 42 via high-pressure EGR (HP-EGR) passage 140 and/or low-pressure EGR (LP-EGR) passage 150. The amount of EGR provided to intake passage 42 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 3 shows a high-pressure EGR system where EGR is routed from upstream of a turbine of a turbocharger to downstream of a compressor of a turbocharger and a low-pressure EGR system where EGR is routed from downstream of a turbine of a turbocharger to upstream of a compressor of the turbocharger. Further, as shown in FIG. 3, the HP-EGR system may include HP-EGR cooler 146 and the LP-EGR system may include LP-EGR cooler 158 to reject heat from the EGR gasses to engine coolant, for example. In alternative embodiments, engine 10 may include only an HP-EGR system or only an LP-EGR system.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A wastegate valve may be present (not shown) such that, when closed, exhaust gas passes through the turbine to generate boosted intake air. Charge air cooler (CAC) 60 is arranged along the intake passage upstream of throttle 62 for cooling engine air after it has passed through turbine 164 and compressor 162 of the turbocharger. Charge-air cooler 3 of FIGS. 1-5 is one non-limiting example of CAC 60. As such, CAC 60 may also include a bypass (not shown) regulated via a swing valve and throttle valve.

Exhaust gas sensor 126 is shown coupled to exhaust passage 48 upstream of emission control system 70 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control device 71 is shown arranged along exhaust passage 48 downstream of exhaust gas sensor 126. Emission control devices 71 may be a selective catalytic reduction (SCR) system, three way catalyst (TWC), $NO_x$ trap, various other emission control devices, or combinations thereof. For example, device 71 may be a TWC and device 72 (not shown in FIG. 3) may be a particulate filter (PF). Further, in some embodiments, during operation of engine 10, emission control device 71 may be periodically reset by operating at least one cylinder of the engine within a particular air/fuel ratio.

Controller 12 is shown in FIG. 3 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 3 shows only one cylinder of a multi-cylinder engine, and each cylinder may similarly include its own set of intake/exhaust valves, fuel injector, spark plug, etc.

Figure 4:
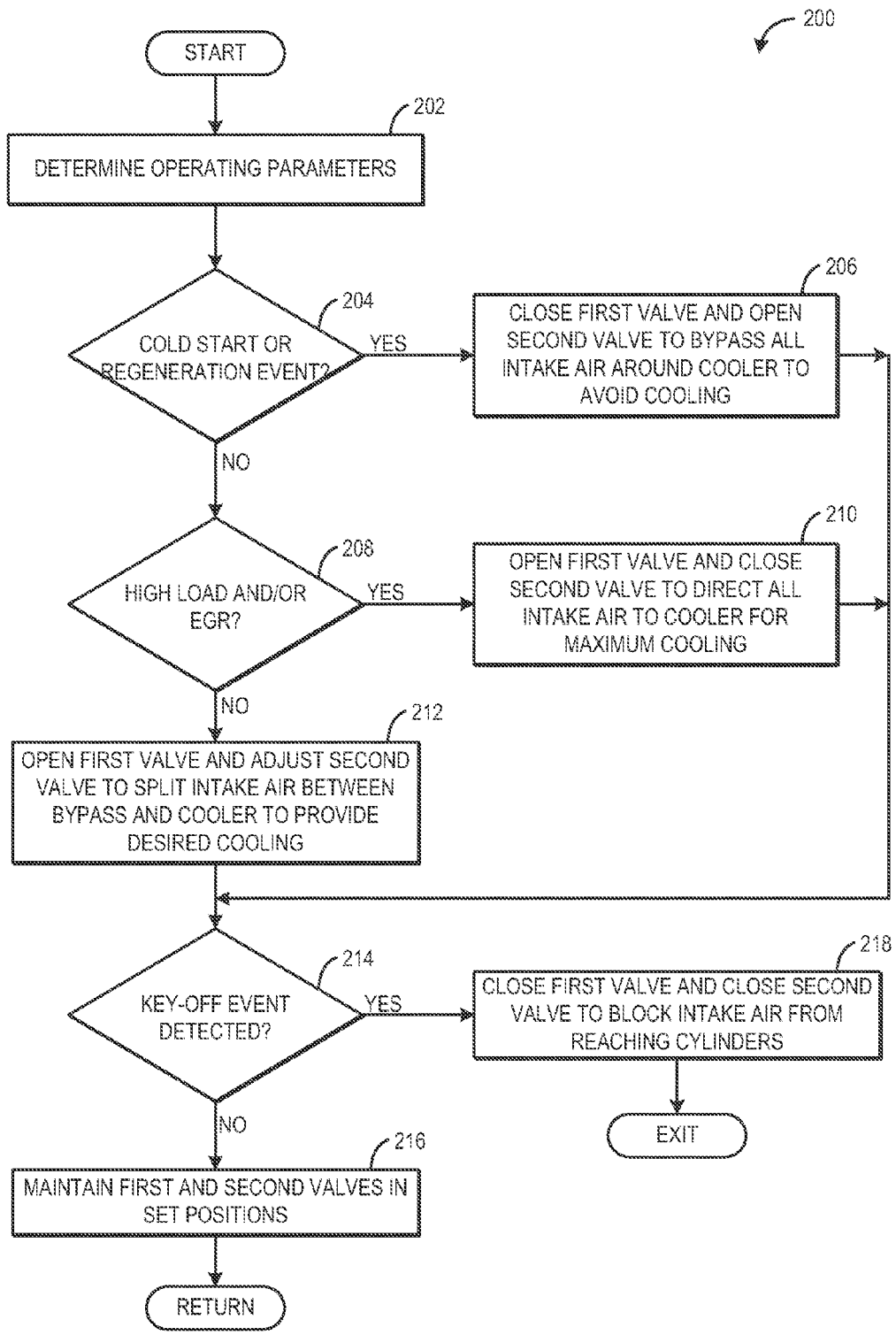
FIG. 4 is a flow chart illustrating a method for the device controlling the charge-air flows according to an embodiment of the present disclosure.

Turning now to FIG. 4, a method 200 for controlling bypass of a charge air cooler is presented. Method 200 may be carried out by a controller, such as controller 12, in order to regulate the valves (such as shut-off elements 6 and 7) upstream of the charge air cooler (e.g., charge-air cooler 3). Method 200 comprises, at 202, determining engine operating parameters. The engine operating parameters may include engine temperature, engine load, EGR amount, etc. At 204, method 200 includes determining if the engine is operating with cold start conditions or with a regeneration event of an emission control device arranged in the exhaust system of the engine. Cold start conditions may be indicated when engine temperature is below warmed-up engine temperature. A regeneration event may be indicated based on a signal sent from the controller that the engine is undergoing a regeneration event, which may in turn be based on a length of time since a previous regeneration event, an amount of exhaust back pressure, and other parameters. If the engine is in cold start or operating with a regeneration event, method 200 proceeds to 206 to close a first charge air cooler bypass valve and open a second charge air cooler bypass valve to bypass all intake air around the cooler. The first bypass valve may be the shut-off element 6 of FIGS. 1-5, and may be a throttle-type valve that includes two restriction levels. The second bypass valve may be the shut-off element 7 of FIGS. 1-5, and may be a swing-type valve that includes a plurality of restriction levels (e.g., three or more restriction levels). The second bypass valve may be located upstream of the first bypass valve, and may act to restrict an opening to a bypass passage that bypass the charge air cooler. By closing the first valve and opening the second valve, the intake air completely bypasses the charge air cooler to avoid being cooled, enabling warmer intake air to heat the engine and/or downstream emission control device.

If the engine is not operating with cold start or a regeneration event, method 200 proceeds to 208 to determine if the engine is operating with high load and/or a relatively high amount of EGR flow. During high load conditions or when a high level of EGR is present in the intake, the intake air may reach high temperatures, and maximum cooling via the charge air cooler may be desired. Thus, if the engine is operating with high load or high EGR, method 200 proceeds to 210 to open the first bypass valve and close the second bypass valve to direct all intake air through the charge air cooler, and block the intake air from traveling through the bypass passage, in order to provide maximum cooling.

If the engine is not operating with high load or high EGR, method 200 proceeds to 212 to open the first bypass valve and adjust a restriction level of the second bypass valve based on desired intake air temperature. Desired intake air temperature may be based on the amount of boost pressure, temperature of the engine, temperature of a downstream catalyst, engine speed and load, etc. The desired intake temperature may be compared to the measured intake air temperature (determined by a temperature sensor positioned in the intake passage or estimated based on engine temperature), and if the temperatures are different, the restriction level of the second valve may be adjusted. In this way, a portion or an entirety of the intake air may bypass the charge air cooler, depending on the restriction level to which the second bypass valve is set. The more cooling that is desired, the more restricted (e.g., closed) the second valve may be set.

After setting the first and second bypass valves in respective desired positions at 206, 210, or 212, method 200 proceeds to 214 to determine if a key-off event has been detected. If no key-off event is detected (e.g., the engine is still in standard operation), at 216, the first and second valves are maintained in the positions determined at 206, 210, or 212, and then method 200 returns to continue to monitor operating conditions and set the positions of the first and second bypass valves based on operating conditions. If a key-off event is detected, method 200 proceeds to 218 to close both the first bypass valve and the second bypass valve to prevent intake air from reaching the cylinders. During shut-down of the engine following a key-off event, intake air may be pulled into the engine by one or more cylinders that are in run-down mode, and this may cause engine shudder. By blocking intake air from reaching the cylinders via closure of both the first and second valves, the shudder may be prevented. Method 200 then exits.

Thus, the methods and systems described herein provide for a method for an engine including a plurality of cylinders, comprising during engine operation, adjusting a first bypass valve and a second bypass valve of a charge air cooler based on a desired intake air temperature; and in response to a key-off event, closing both the first and second bypass valves to prevent intake air from reaching the cylinders. The method also includes wherein adjusting the first bypass valve and the second bypass valve of the charge air cooler based on a desired intake air temperature further comprises opening the first bypass valve and closing the second bypass valve during high engine loads. The method includes wherein adjusting the first bypass valve and the second bypass valve of the charge air cooler based on a desired intake air temperature further comprises closing the first bypass valve and opening the second bypass valve during a regeneration event of an emission control device positioned in the exhaust of the engine.

The methods and systems described herein also provide for an engine system, comprising an engine, a charge air cooler upstream of the engine, a first charge air cooler bypass valve adjustable to two restriction levels, and a second charge air cooler bypass valve adjustable to three or more restriction levels. The engine system further comprises a controller including instructions for, when full bypass of the charge air cooler is indicated, closing the first charge air cooler bypass valve, and when full bypass is not indicated, opening the first charge air cooler bypass valve and adjusting the second charge air cooler bypass valve based on desired intake air temperature. Full bypass may be indicated in response to an engine cold start and/or in response to a regeneration event of a downstream emission control device.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an internal combustion engine having at least one cylinder and at least one intake line for supplying charge air to the at least one cylinder:
controlling charge-air flows conducted via a charge-air cooler and via a bypass line around the charge-air cooler with a two-stage switchable shut-off element and a continuously adjustable shut-off element which is continuously adjustable between an open position and a closed position, the bypass line arranged in parallel with an intake line in which the charge-air cooler is positioned,
wherein the two-stage switchable shut-off element is located within the intake line upstream of an outlet of the bypass line into the intake line and downstream of an inlet into the bypass line from the intake line and is switched between an open position and a closed position, and
wherein the bypass line is opened up or shut off to a greater or lesser extent by the continuously adjustable shut-off element, the continuously adjustable shut-off element having an axis of rotation arranged upstream of a freely pivotable end, the axis of rotation arranged at the outlet of the bypass line into the intake line.

2. The method as claimed in claim 1, wherein, by the continuously adjustable shut-off element being in the closed position, the bypass line is blocked, and by the continuously adjustable shut-off element being in the open position, the at least one intake line is at least narrowed.

3. The method as claimed in claim 1, further comprising closing the continuously adjustable shut-off element and opening the two-stage switchable shut-off element in order to conduct an entirety of the charge-air flow through the charge-air cooler and cool said charge-air flow.

4. The method as claimed in claim 1, further comprising at least partially opening the continuously adjustable shut-off element and opening the two-stage switchable shut-off element in order to conduct the charge-air flow partially through the charge-air cooler and partially past the charge-air cooler via the bypass line.

5. The method as claimed in claim 1, further comprising fully opening the continuously adjustable shut-off element and closing the two-stage switchable shut-off element in order to conduct the charge-air flow substantially past the cooler via the bypass line.

6. The method as claimed in claim 1, further comprising only partially opening the continuously adjustable shut-off element and closing the two-stage switchable shut-off element in order to conduct the charge-air flow substantially past the cooler via the bypass line and throttle said charge-air flow.

7. The method as claimed in claim 1, further comprising closing the continuously adjustable shut-off element and closing the two-stage switchable shut-off element in order to prevent supply of charge air to the at least one cylinder.

8. A method for an engine including a plurality of cylinders, comprising:
during engine operation, adjusting a first bypass valve within an intake line passing through a charge-air cooler and a second bypass valve having a rotatable axis arranged upstream of a freely pivotable end thereof based on an intake air temperature, the intake line arranged in parallel with a bypass line in which charge-air flows are conducted around the charge-air cooler, the first bypass valve arranged upstream of an outlet of the bypass line into the intake line and downstream of an inlet into the bypass line from the intake line, and the rotatable axis of the second bypass valve arranged at the outlet of the bypass line into the intake line; and
in response to a key-off event, closing both the first and second bypass valves to prevent intake air from reaching the cylinders.

9. The method of claim 8, wherein the first and second bypass valves are adjusted to maintain a desired intake air temperature, and wherein adjusting the first bypass valve and the second bypass valve based on a desired intake air temperature further comprises opening the first bypass valve and closing the second bypass valve during high engine loads and/or during a regeneration event of an emission control device positioned in an exhaust of the engine.

* * * * *